Jan. 7, 1969 J. W. HOYT 3,420,096
MEASUREMENTS OF MOLECULAR WEIGHTS OF HIGH POLYMERS
Filed Sept. 20, 1966
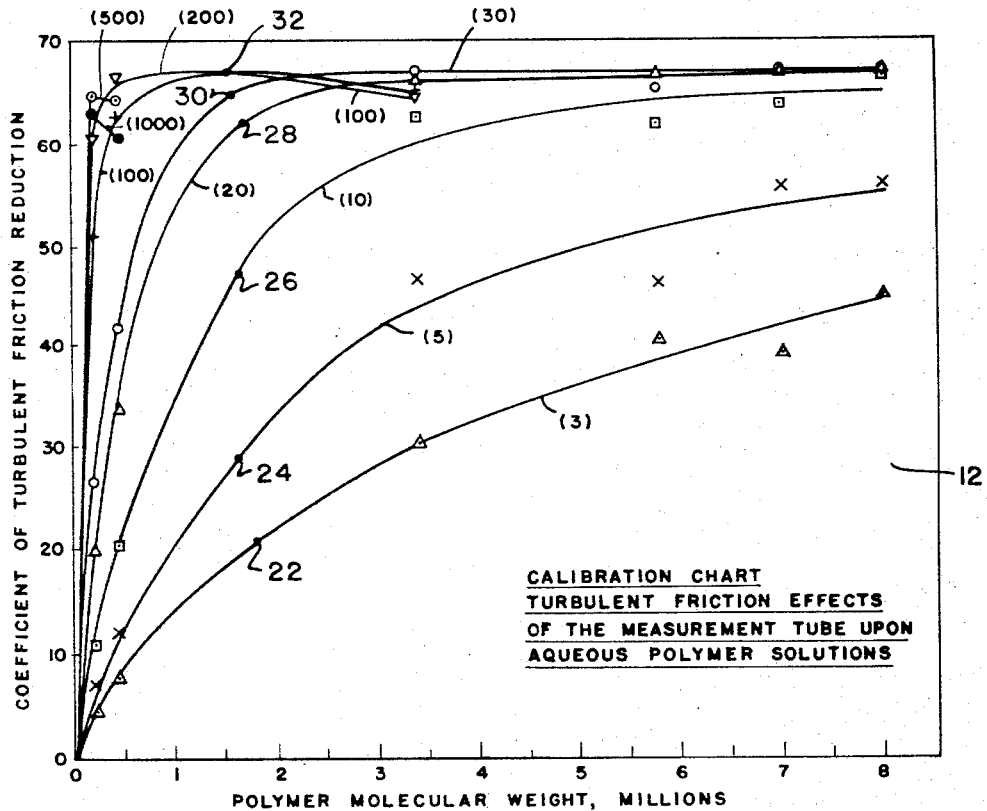
FIG. 1.
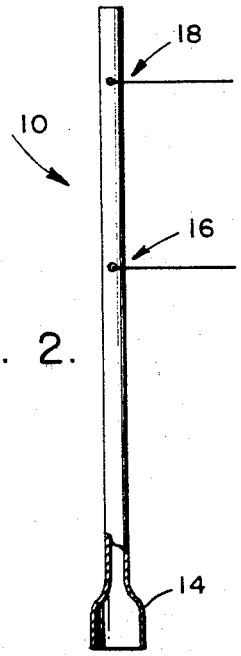
FIG. 2.
| CALIBRATION DATUM SYMBOL | SOLUTION CONCENTRATION (PPM – WT.) |
|---|---|
| ▲ | 3 PPM |
| × | 5 PPM |
| ▫ | 10 PPM |
| △ | 20 PPM |
| ○ | 30 PPM |
| + | 100 PPM |
| ▽ | 200 PPM |
| ⊚ | 500 PPM |
| ● | 1000 PPM |
FIG. 3.
*INVENTOR.*
JACK W. HOYT
BY
MICHAEL F. OGLO
ROY MILLER
ATTORNEYS.

United States Patent Office 3,420,096
Patented Jan. 7, 1969

3,420,096
MEASUREMENTS OF MOLECULAR WEIGHTS
OF HIGH POLYMERS
Jack W. Hoyt, Pasadena, Calif., assignor to the United
States of America as represented by the Secretary of
the Navy
Filed Sept. 20, 1966, Ser. No. 580,837
U.S. Cl. 73—54  1 Claim
Int. Cl. G01n *11/02*

ABSTRACT OF THE DISCLOSURE

A method for determining the molecular weight of a high polymer compound comprising the steps of forcing the solution through a measuring tube, measuring the pressure between two sensing stations on the tube, and calculating the coefficient of turbulent friction reduction. The result is then compared with a plot of molecular weight vs. measured values of coefficient of turbulent friction reduction for reference polymers of known molecular weight to determine the molecular weight of the unknown polymer.

---

The invention described herein may be manufactured and used by or for the Government of the United States of America for governmental purposes without the payment of any royalties thereon or therefor.

The prior art methods for determining molecular weight of polymer materials, in the range of molecular weights referred to, include: light scattering, sedimentation in an ultra centrifuge, and viscometry. Certain disadvantages are associated with each, which tend to limit their respective usefulness. The light scattering method works only with polymers producing solutions having optical clarity or chemical purity, and further involves elaborate electronic equipment and considerable training on the part of operators. The accuracy of the method of employing an ultra centrifuge is not adequate enough for many purposes. Viscometry requires a prior calibration of the equipment to the particular polymer compound being worked upon and therefore effectively requires a prior knowledge, which begs the question.

Accordingly, an object of the invention is to provide a method for determining the molecular weight of polymer compounds having molecular weights in the range between $0.1 \times 10^6$ to $10 \times 10^6$, which is more nearly universally applicable to the variety of circumstances out of which a need for measuring molecular weight may arise.

Another object is to provide a method in accordance with the preceding objective in which chemical purity of the material under test is not required.

A further object is to provide a method in accordance with the first stated objective which can be implemented by apparatus requiring only a very small sample, may be performed by an operator without need for special training, and which enables the quick gathering and interpretation of the data.

Other objects and many of the attendant advantages of this invention are possible in the light of the above teachings. It is therefore to be understood that within the scope of the appended claims the invention may be practiced otherwise than as specifically described.

FIG. 1 is a chart constituting a calibration of the turbulent friction effects of the tube of FIG. 2 upon a family of known polymer solutions having different molecular weights of additive and different concentrations of additive, and on which certain experimental datum has been entered;

FIG. 2 is a diagrammatic view of a measuring tube employed in the method of the present invention; and FIG. 3 is a table of the datum symbols for identifying the concentration of the calibration solutions used in deriving the chart of FIG. 1.

Referring now to FIGS. 1 and 2 of the drawing, the method for determining molecular weight of a polymer in accordance with this invention requires a turbulent friction measurement tube 10, and a tube-molecular weight calibration chart 12.

Measurement tube 10 has a large length to inner diameter ratio. One end of the tube has an enlarged portion 14 forming the inlet end, and a pair of pressure sensing stations 16 and 18 are located along a portion of the tube's span near its outlet end. Highly successful results have been obtained by adapting a motor-driven hypodermic syringe for this purpose. The tube calibration chart of the embodiment illustrated in the drawing is for a hypodermic tubing, having dimensions of 0.046" inner tube diameter with the pressure sensing stations located 3" apart.

Measuring tube 10 is used for the measurement of turbulent friction properties of specimens of liquid polymer solution. The liquid is forced through the tube at a predetermined flow rate which is sufficiently high to obtain fully developed turbulent flow of the liquid along the span between pressure stations 16 and 18, and the sensed pressure differential between the stations is averaged over a period of time by means of a suitable system of transducers and an oscillograph. The average measured pressure is a quantitative figure of merit representing the turbulent flow drag properties of the liquid forced through the tube. By comparison of such average pressure difference for a solution containing a polymer with the corresponding pressure difference for the solvent alone, one obtains a coefficient of comparative turbulent friction reduction of the polymer solution relative to that of the solvent alone. This coefficient of comparative turbulent friction reduction, denoted by the alphabetical letter A, and expressed as a percentage, is obtained from test measurements and calculations in accordance with the following formula:

$$A \text{ (percentage)} = 1 - \frac{B}{C}(100)$$

wherein

B = the measured average pressure differential between the two stations in the case of the flow of specimen polymer solution
C = the corresponding pressure differential in the case of flow of the solvent alone.

For a fuller disclosure of the theory of this process for measurement of turbulent friction and for a disclosure of details of a preferred motor-driven hypodermic syringe structure to be employed in implementing this process, reference is made to the copending application of J. W. Hoyt entitled, "Turbulent Friction Measurement," S.N. 456,579, filed May 17, 1965 now Patent No. 3,327,522.

Calibration chart 12 is a chart representing a matrix of values of coefficients of comparative turbulent friction reduction for a plurality of polymer solutions with the polymer in the solutions varying in molecular weight and in concentration of solution, but all using a common solvent. For example, the chart illustrated in the drawing was obtained by measuring the coefficient, using a measuring tube having the mentioned illustrative dimensions, for a series of calibration solutions of poly(ethylene) oxide materials dissolved in water. A series of such materials were used having the different molecular weights of $0.2 \times 10^6$, $0.45 \times 10^6$, $3.4 \times 10^6$, $5.8 \times 10^6$, $7 \times 10^6$, and $8 \times 10^6$. Measurements of the comparison coefficients for each of these different molecular weight polymer materials were made for solution concentrations of 3 p.p.m., 5 p.p.m., 10 p.p.m., 20 p.p.m., 30 p.p.m., 100 p.p.m., 200 p.p.m., 500 p.p.m., and 1,000 p.p.m. (all by weight), and entered as calibration points on the chart. The value of concentration of solution of each of the calibration points in the matrix is identified by the calibration datum point symbols disclosed in the table of FIG. 3. Curves of constant concentration have been fitted to the calibration datum points, and are identified by lead lines denoting the respective values, enclosed in parenthesis brackets, of the solution in parts per million. The zero values of all curves of constant concentrations have been set at the molecular weight value of 50,000 based upon a general empirical finding that positive values of coefficient of comparative turbulent friction reduction have not been observed for any lower molecular weights.

With tube 10 and chart 12 in hand, then, a sample of polymer of unknown molecular weight is prepared in solutions of various predetermined concentrations convenient for use with chart 12. For example, solutions of the unknown polymer values of concentrations corresponding to certain of the curves of constant concentration of chart 12 are prepared, and the comparison coefficients of these solutions are measured. Exemplary experimental measurements are shown in column (b) of the following chart. The values of column (b) are then entered as experimental datums along the corresponding curves of constant concentration of the chart. These experimental datum points are designated by the series of reference numerals 20, 22 . . . 30. The correspondence between these reference numerals and the experimental measurements are shown in column (c) of the table

| (a) | (b) | (c) |
|---|---|---|
| Concentration of solution | Measured comparison coefficient | Ref. numeral of datum on drawing |
| 3 | 20.6 | 20 |
| 5 | 29 | 22 |
| 10 | 47 | 24 |
| 20 | 62 | 26 |
| 30 | 65 | 28 |
| 100 | 67 | 30 |

It will be apparent from the drawing that the datum points are in approximately vertical alignment within a range of molecular weight of $1.6$–$1.8 \times 10^6$, indicating that the molecular weight of the specimen polymer materials lies within that range. It is to be noted that a fair estimation of molecular weight could be had with a fewer number of experimental datums or even a single datum point, but there is a danger of poorer resolution with the use of fewer experimental datum points. This is because the sensitivities (i.e. slopes) of the different curves of constant concentration vary at a particular value of molecular weight.

Even if the polymer concentration of the unknown molecular weight sample is also unknown, an estimate of the molecular weight can sometimes still be obtained. For example, in a sample of algae culture medium it was found that the algae had elaborated a high molecular weight compound into the water. By running tests in a test apparatus disclosed in the copending application at full culture strength and also by running tests with various dilutions with distilled water, the following data were obtained.

| Culture strength, percent: | Measured comparison coefficient |
|---|---|
| 100 | 57.3 |
| 83 | 62.9 |
| 80 | 65.8 |
| 60 | 47.6 |
| 50 | 40.9 |
| 10 | 9.8 |

Different values of concentration of polymer are assumed for the 100% culture, and the corresponding values of concentration for the tested dilution of the culture are calculated by simple mathematical proportioning. This results in a series of datum values of measured comparison coefficient for particular assumed concentrations which correspond to a vertical array of spaced datum points 20, 22 . . . 30 in the earlier described procedure. With the aid of the lines of constant concentration for the purpose of making extrapolations of values of concentrations, the vertical array of datum points is matched to the matrix of values in chart 12. If the spacing of the experimental data match the spacing of the calibration data for a particular abscissal region of the chart, then the assumed value of polymer concentration for the culture is correct, and the molecular weight of its constituent polymer is the abscissal value where the experimental and calibration data most nearly match. If a match is not found, a trial and error process of assuming different values of concentration for the 100% culture is pursued until a match is found. In the case of the data in the above example of an algae cuture medium, it can be shown that this process of matching the experimental and calibration data results in the identification of the concentration of polymer at approximately 500 p.p.m. with the molecular weight of polymer at approximately 100,000.

It is to be noted that the tube-molecular weight calibration chart 12, is applicable only for tests performed on water solutions and using a measuring tube having the specified dimensions. Thus a different calibration chart must be drawn for each solvent, and each measuring tube of different dimensions.

An important feature of the invention is that chemical purity of test solutions is not required, since low molecular weight contaminants or inert dust particles play no part in the friction reducing process.

Another important feature stems from the fact that the required test measurements may be implemented by the motor-driven syringe apparatus disclosed in copending application S.N. 456,579, and therefore the attendant advantages of that apparatus, viz, requiring only a small sample, absence of need for special training of the operator, and ability to quickly gather and interpret data, may also be ascribed to the present invention.

Obviously many modifications and variations of the present invention are possible in the light of the above teachings. It is therefore to be understood that within the scope of the appended claims the invention may be practiced otherwise than as specifically described.

What is claimed is:

1. A method for determining the molecular weight of a specimen of polymer material comprising the steps:
   (a) obtaining at least one measurement of coefficient of comparative turbulent friction reduction of a solution of the specimen polymer in a particular liquid solvent relative to the turbulent friction property of the solvent alone, said solution being of a selected one, or more as the case may be, of values of concentration within the approximate range of concentrations from 3 p.p.m. (wt.) to 1000 p.p.m. (wt.),
   (b) matching the one or more measured values of coefficient of comparative turbulent friction reduction obtained for the specimen polymer to a matrix of values of molecular weight vs. measured values of said coefficient of comparative turbulent friction reduction for a plurality of reference polymer compounds of known molecular weight dissolved in the same particular solvent, and for a plurality of different concentration of solutions for each such polymer compound of known molecular weight, said plurality of polymer compounds of known molecular weight having various molecular weights in the range $0.1 \times 10^6$ to $10 \times 10^6$, said plurality of concentrations being of various values in the range from 3 p.p.m. (wt.) to 1000 p.p.m. (wt.);

wherein the measurement of comparative turbulent friction reduction is obtained by the steps of:

(c) forcing the solution through a measuring tube of predetermined length and inner diameter, and at a predetermined rate sufficiently high to obtain full developed turbulent flow along a portion of the tube between spaced pressure sensing stations disposed therealong, (d) measuring the average pressure between said pressure sensing stations as the liquid is flowed along the tube, and (e) calculating the coefficient of turbulent friction reduction in accordance with the following formula:

$$A = 1 - B/C$$

wherein $A$ = coefficient of comparative turbulent friction reduction $B$ = the measured average pressure differential between the pressure sensing stations $C$ = the measured average pressure differential between the pressure sensing station for the case of flowing said particular solvent alone through the tube, (f) said matrix of values of molecular weight vs. measured values of turbulent friction reduction being derived by like measurements through a tube of like dimensions.

References Cited

UNITED STATES PATENTS 3,209,581 10/1965 Crane et al. _____ 73—56 X
3,327,522 6/1967 Hoyt _____ 73—55

FOREIGN PATENTS 677,670 1/1964 Canada.

S. CLEMENT SWISHER, *Primary Examiner.*

J. W. ROSKOS, *Assistant Examiner.*